United States Patent [19]

Endersen et al.

[11] 4,171,949
[45] Oct. 23, 1979

[54] ARRANGEMENT FOR SUPPORTING ROTARY DRUMS

[75] Inventors: William C. Endersen; Børge Johansen, both of Copenhagen, Denmark

[73] Assignee: F. L. Smidth & Co., Cresskill, N.J.

[21] Appl. No.: 824,706

[22] Filed: Aug. 15, 1977

[30] Foreign Application Priority Data

Aug. 16, 1976 [GB] United Kingdom ............ 33954/76

[51] Int. Cl.² .............................................. F27B 7/22
[52] U.S. Cl. .................................... 432/103; 432/104
[58] Field of Search ............... 308/203, 204; 432/103, 432/104, 105; 248/130

[56] References Cited

U.S. PATENT DOCUMENTS

| | | | |
|---|---|---|---|
| 2,269,700 | 1/1942 | Treshow | 248/130 |
| 2,551,774 | 5/1951 | Traylor, Jr. | 308/203 |
| 3,027,553 | 3/1962 | Sandor | 432/104 |
| 3,185,459 | 5/1965 | Cambet et al. | 308/204 |
| 3,517,915 | 6/1970 | Bovagne et al. | 432/103 |
| 3,950,043 | 4/1976 | Endersen | 308/204 |

FOREIGN PATENT DOCUMENTS 1775439  5/1973  Fed. Rep. of Germany ........... 432/103
1578176  8/1969  France ..................................... 308/203

Primary Examiner—Henry C. Yuen
Attorney, Agent, or Firm—Pennie & Edmonds

[57] ABSTRACT

An arrangement is disclosed for supporting a rotary drum such as a rotary kiln resting upon a foundation. The support arrangement includes a weigh beam positioned in a horizontal plane and pivotally supported on the foundation. At least two carrying beams are poitioned in a generally horizontal plane adjacent said weigh beam and each of the carrying beams are pivotally mounted at one end thereof to the foundation and flexibly supported at another end thereof by the weigh beam. A roller for rotatably supporting the rotary drum is supported on the carrying beams by bearings. The support arrangement thereby effects a substantial mechanical equalization of the forces exerted on the roller during the rotation of the drum to warping and twisting of the drum.

23 Claims, 4 Drawing Figures

MEASURING AND ACTIVATING MEANS

ARRANGEMENT FOR SUPPORTING ROTARY DRUMS

BACKGROUND OF THE INVENTION

1. Field of the Invention

This invention relates to arrangements for supporting rotatable drums such as rotary kilns, tube mills, drum sieves and the like.

2. Description of the Prior Art

Rotary drums such as rotary dryers, tube mills, drum sieves and particularly rotary kilns are commonly supported by roller supports. The rotary drums usually are provided with two or more ring-like members known as "track rings" or "live rings" which are secured to the outer circumference of the drum body. Each live ring rests upon a pair of the roller supports. These roller supports rotate about roller shafts which are mounted on solid foundations. In some cases, each roller support is composed of several rollers engaging the live ring and sharing the load of the rotary drum with its material charge.

Ideally, the outer surface of the live ring bears correctly against the outer surface of the roller supports along a common generatrix. The drum with its live rings then is correctly aligned with the support rollers in a vertical plane and along the axis of the drum. However, due to the weight of the drum with its material charge, as well as heat transferred to the drum from the hot material inside, the drum will tend to warp and/or twist. The drum and its attached live rings become temporarily or permanently misaligned (in a vertical plane and/or along the axis of the drum) with the support rollers and the live rings inaccurately bear against the support rollers, not along a common generatrix.

Under unfavorable conditions, the load on the support rollers may increase to a multiple of the normal load for which the support rollers are designed. Such loads result in localized contact pressures between the live ring and the roller supports which cause severe damage to the live rings and the support rollers. Because of the unequal distribution of the load on the support rollers, a total breakdown or collapse of the roller supports may result. Further, the unequally distributed load contacting the surface of the support rollers may inadvantageously cause edge pressure on the rollers.

To compensate for such misalignments, it is a usual practice to provide the drums with roller supports which are designed to take these conditions into account. For example, the rollers may be supported pivotally in bearings to compensate for axial misalignment, and the bearings may be resiliently supported to compensate for misalignment in the vertical plane.

It is thus well known to use a roller support in which the bearings for the roller shaft permit pivotal movement of the roller shaft and permit displacement of the roller shaft bearings in a substantially vertical plane. The bearings may be supported by a member having a surface configured as a section of a sphere. A housing for each bearing may be supported directly or indirectly by a hydraulic cylinder or a flexible cushion. More particularly, the housing may be supported on a rocker pivoting about an axis substantially parallel to the axis of the drum. As a result of the prior art arrangements, the rollers tend to follow the live ring track on the drum but inadvantageously, localized pressure still exists.

To compensate further for any misalignment, the hydraulic cylinders may be interconnected and balanced with each other by equalizing connections. The roller supports, however, must inadvantageously be fully dependent upon an auxiliary hydraulic system.

Further, the known roller bearings in which the bearings for the roller shaft are supported by flexible cushions (such as rubber pads) do not satisfactorily equalize the misaligning forces exerted by the drum on the roller bearings. That is, the live ring and roller bearings do not fully align along a common generatrix resulting in damage to the machinery.

We have invented an improved roller support arrangement for supporting rotary drums which overcomes the disadvantages of the prior art by providing improved compensation of misalignments due to warping or twisting of the drum.

SUMMARY OF THE INVENTION

This invention provides an arrangement for supporting a rotary drum upon a foundation, the drum having a ring-like member positioned thereabout which comprises a roller shaft positioned generally longitudinal of the drum and being supported at each end portion relative to the foundation by first and second bearing means. The invention includes roller means positioned generally medial of said roller shaft in rotational engagement with said ring-like member to provide support for the drum. First and second support beams extend generally transverse to the longitudinal axis of the drum. One end portion of each support beam is pivotally mounted on the foundation for pivotal movement about an axis generally parallel to the axis of the drum. The support beams are spaced to support the first and second roller shaft bearing means and are movably supported by support means positioned at other end portion. A third support beam extends generally parallel to the axis of the drum and supports the movable end portion of the first and second support beams. The third support beam is supported generally medially upon the foundation by rocking bearing means permitting rocking motion of the third support beam.

In a preferred embodiment, the support arrangement includes a weigh beam positioned in a generally horizontal plane and supported upon the foundation; means such as a central bearing disposed between the weigh beam and the foundation for pivotally supporting said weigh beam on the foundation; and at least two carrying beams positioned in a generally horizontal plane adjacent and generally transverse to the weigh beam. Each of the carrying beams are pivotally mounted at one end portion thereof to the foundation. The invention also comprises means such as at least one composite bearing or flexible cushion for movably supporting the other end portion of each carrying beam upon said weigh beam; and roller means such as a roller having a roller shaft supported upon said carrying beams for rotatably supporting the rotary drum. The support arrangement may further include bearing means for rotatably supporting said roller means on said carrying beams. Misalignments are substantially eliminated by the inventive support arrangement.

The weigh beam supporting the carrying beams thus is supported pivotally by a single, central rocking bearing and mounted on a foundation which brings about a mechanical equalization of the forces acting upon the bearings of the roller shaft during the rotation of the drum due to warping and twisting thereof. Any differences in forces exerted on the roller shaft bearings are immediately and automatically equalized. Further, the construction is reliable under all circumstances because it is independent of any auxiliary system.

The bearings means for the roller and its roller shaft may each be composed of a plain bearing resting pivotally in a partly spherical bearing. The shaft of the roller is then arranged to rotate in the plain bearing. Any misalignment of the live ring and the roller is transmitted through the roller to the bearings for the roller shaft. Because the plain bearing for the roller shaft pivots slightly in the spherical bearing, the plain bearing and roller shaft follow a possible misalignment of the rotary drum.

End portions of the carrying beams may rest on the weigh beam via the composite bearings and each composite bearing comprises a partly spherical bearing combined with a plain bearing. By means of the composite bearings, any undue friction or stresses between the carrying beams and the weigh beam are eliminated. Even great deviations in the position of the weigh beam may be allowed because the composite bearings for the movable end portions of the carrying beams follow the carrying beams or vice versa.

Alternatively, the movable end portions of the carrying beams may engage the weigh beam via the flexible cushions. When a misalignment is compensated by adjustment in the position of the carrying beams, the flexible cushion is able to withstand the forces involved and is able to neutralize the minor displacements between the carrying beams and the weigh beam. Further, the flexible cushion is favorable for neutralizing the forces involved in warping of the drum. Of course, the choice and arrangement of the bearings may depend upon various circumstances such as the size of the drum, etc.

The central bearing for the weigh beam may be a partly spherical bearing or a flexible cushion. Either of these embodiments advantageously allow a rocking movement of the weigh beam. In some cases, however, it may be advantageous for the central bearing to be resilient and obtain maximum flexibility in the movement of the roller support.

Both end portions of the weigh beam may be balanced further by hydraulic cylinders acting between the end portions of the weigh beam and the foundation. The hydraulic cylinders are utilized to lift the roller bearings and aid in the alignment of the support arrangement. The hydraulic cylinders may also be permanently installed to cooperate with the weigh beam and provide inertia in the support and even introduce a preferred distribution of the load on the bearings.

The hydraulic cylinders or the weigh beam may be equipped with control and weighing equipment. This feedback control system intermittently or continuously measures the load on the hydraulic cylinders and if these loads are excessive (indicating misalignment), it activates the cylinders to aid in the alignment of the rollers and the live ring. It is then possible to provide a control system which also ensures the intermittent or permanent alignment of the drum with the roller supports.

BRIEF DESCRIPTION OF THE DRAWINGS

Preferred embodiments of the present invention are described hereinbelow and illustrated in the accompanying drawings, wherein.

DETAILED DESCRIPTION OF THE PREFERRED EMBODIMENTS

Figure 1:
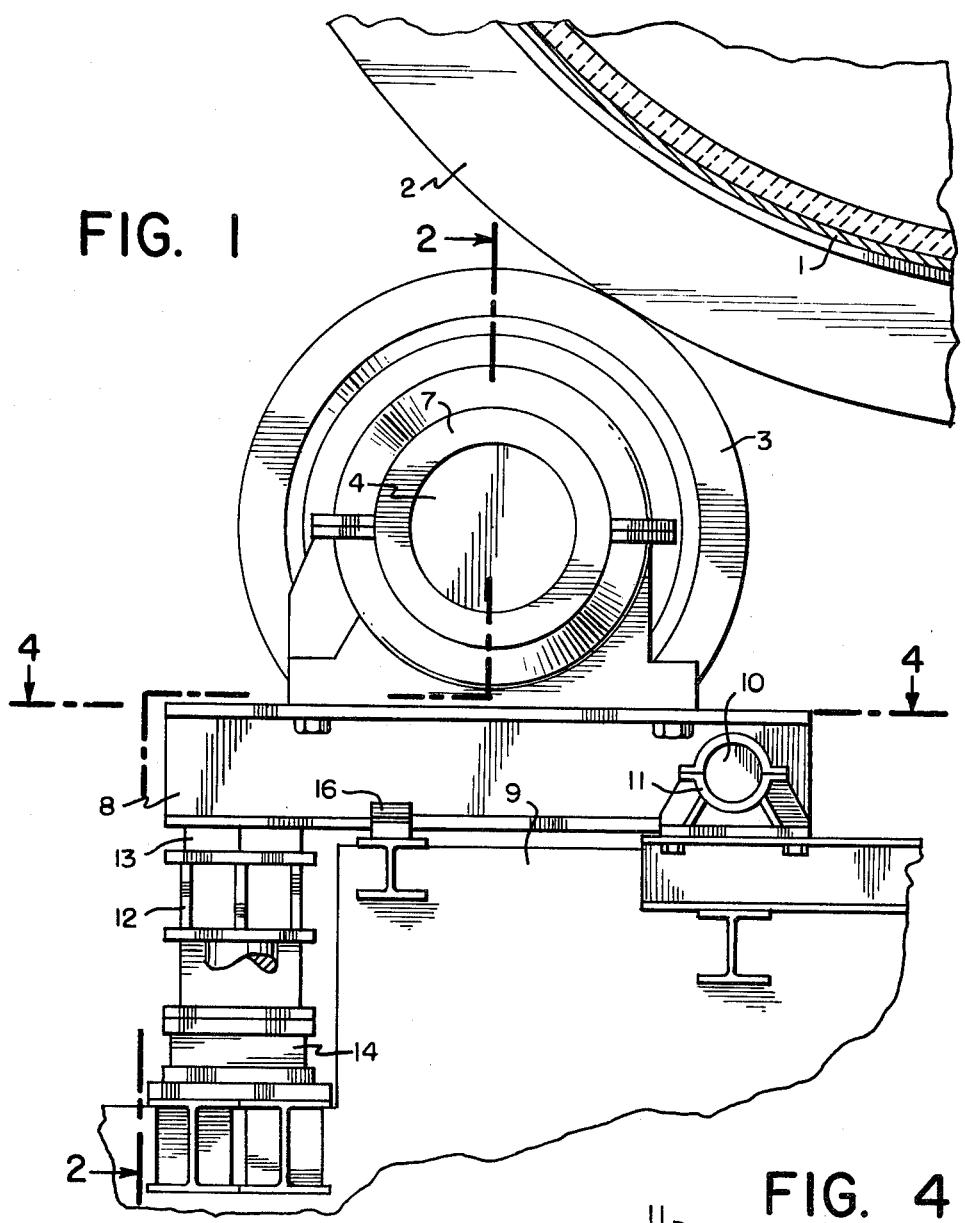
FIG. 1 is an end view, partly in section, of an arrangement for supporting rotary drums according to the present invention.
Figure 2:
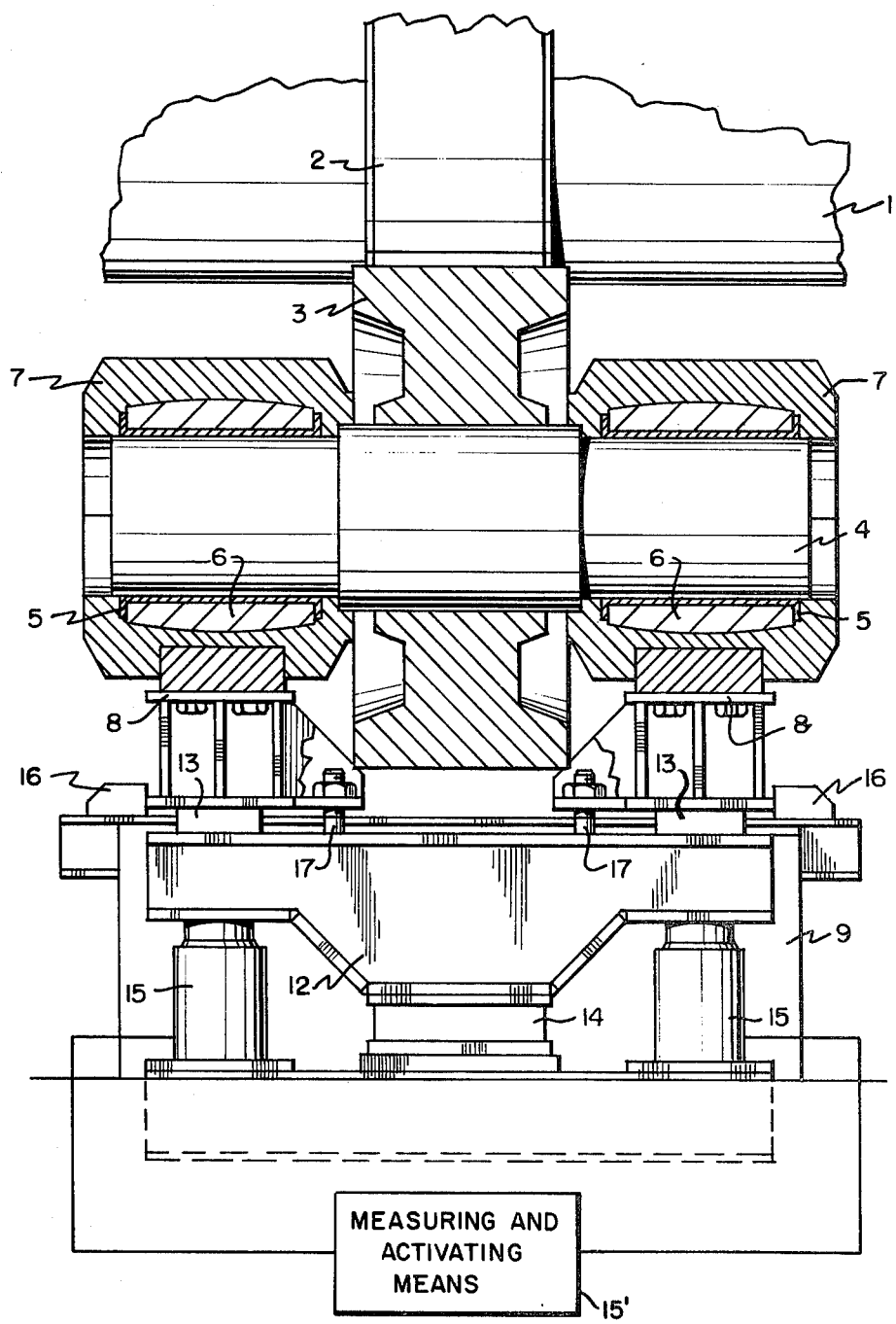
FIG. 2 is a sectional view taken along line 2—2 of FIG. 1.

FIGS. 1 and 2 illustrate a roller support for a rotary drum such as a rotary kiln. There is shown a rotary drum 1 surrounded by a live ring 2, a roller 3 having a roller shaft 4 and a bearing housing 7, a carrying beam 8, a weigh beam 12 and a foundation 9.

Live ring 2 engages roller 3 along a common generatrix. Roller 3 is mounted on roller shaft 4 and each end of the shaft is rotatably supported in a partly cylindrical bearing 5 combined with a spherical bearing 6. The two pairs of combined bearings 5 and 6 are positioned within respective bearing housings 7.

Bearing housings 7 are attached respectively to first and second carrying or support beams 8. The carrying beams are generally positioned in a horizontal plane and have their longitudinal axis generally perpendicular to the rotational axis of drum 1. An end of each carrying beam is pivotally mounted on foundation 9 by means of a shaft 10 which is rotatable in bearings 11. The other end (movable end) of each carrying beam 8 rests upon the end of weigh or third support beam 12 in a yielding manner. Weigh beam 12 is generally positioned in a horizontal plane and has its longitudinal axis generally parallel to the rotational axis of drum 1. A flexible cushion 13 is inserted between the movable end of each carrying beam 8 and weigh beam 12. The central portion of weigh beam 12 is supported on foundation 9 by another flexible cushion 14. Although not necessary, hydraulic cylinders 15 are positioned between the ends of weigh beam 12 and foundation 9. Hydraulic cylinders 15 are not shown in FIG. 1.

Illustratively, carrying beams 8 are protected against torsion in the pivotal attachment (e.g., shaft 10) of the carrying beam by check blocks 16 which are fixed to foundation 9. Guiding bolts 17 are attached to carrying beams 8 and weigh beam 12 to prevent torsion of the carrying beams proper due to misalignment.

Figure 3:
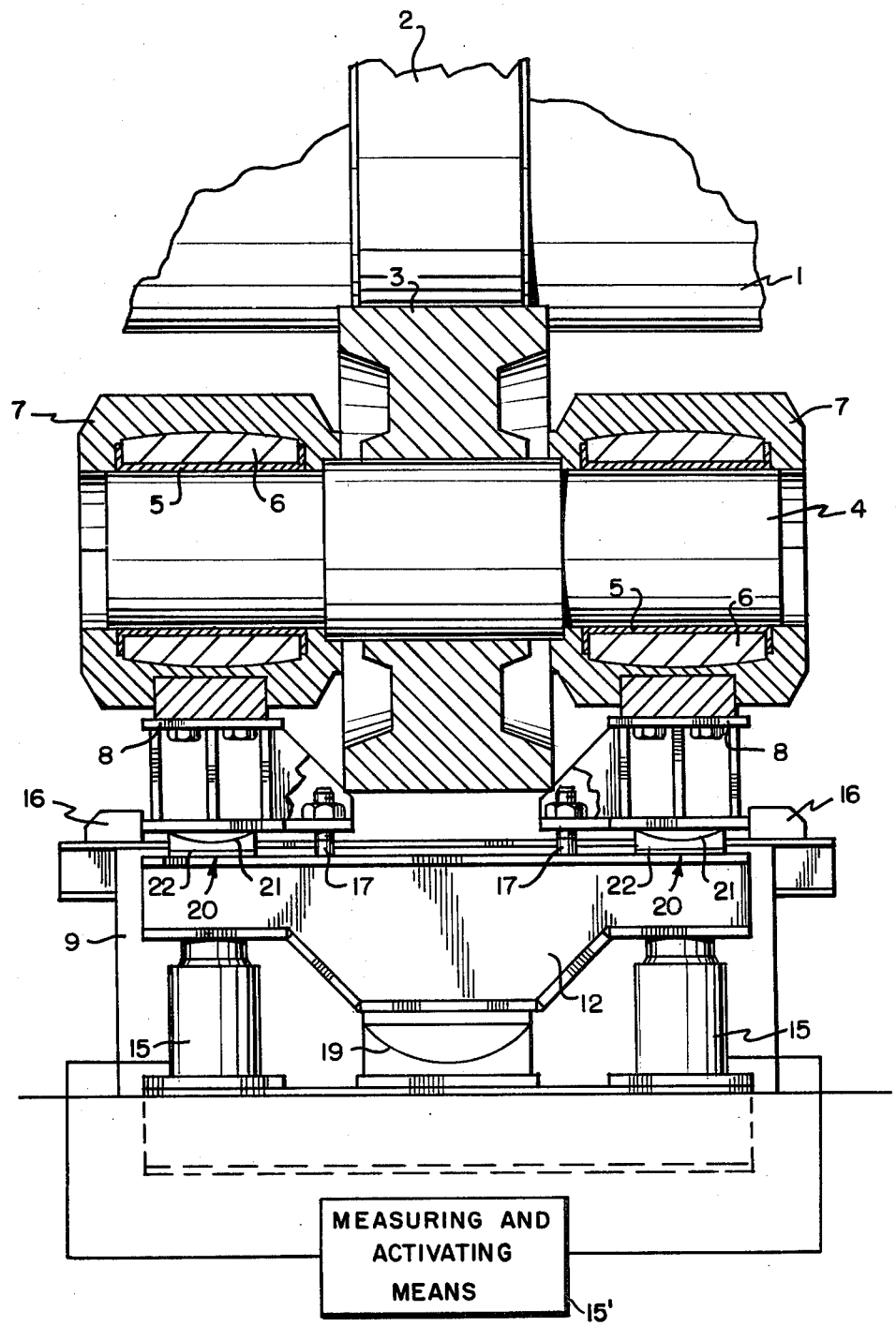
FIG. 3 is a sectional view similar to FIG. 2 but illustrating another embodiment of to the present invention.

FIG. 3 illustrates the roller support arrangement of the present invention wherein the flexible cushions of FIG. 2 are replaced by bearings. More specifically, a single bearing 19, having a partly spherical configuration, replaces flexible cushion 14. Combined bearings 20 replace flexible cushions 13 of carrying beams 8. Each combined bearings 20 comprises a bearing 21 having a configuration of a section of a sphere and a plain bearing 22.

Figure 4:
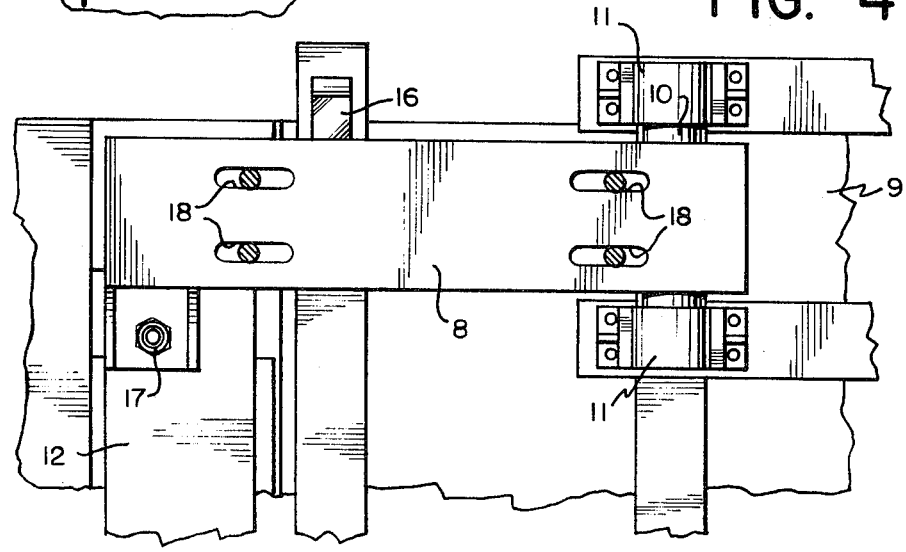
FIG. 4 is a sectional view taken along line 4—4 of FIG. 1.

FIG. 4 shows a detailed view of carrying beam 8 according to the present invention wherein one end of this beam pivots about shaft 10 and its other end rests upon weigh beam 12 in a yielding manner. Bearing housing 7 (not shown in FIG. 4) is adjustably bolted to carrying beam 8 by bolts through slits 18.

The support arrangement shown in the drawings illustrates only one adjustable roller support for rotary drum 1, such as a rotary kiln. The drum is supported by a number of identical roller supports positioned on both sides of the drum in a well known manner.

According to the present invention, roller 3 supports live ring 2 along a common generatrix under normal operation of drum 1. When the alignment of live ring 2 is disturbed in relation to roller 3—for example, due to buckling of the drum or torsion of the drum—a generatrix of live ring 2 will be out of alignment with the normal position of roller 3. However, the adjustable roller support of the present invention allows roller 3 to follow the misalignment of live ring 2 so that roller 3 constantly supports the live ring along a common generatrix. Advantageously, the contact pressure of the live ring on the roller is equally distributed on the support rollers.

The total load exerted by drum 1 on the roller support arrangement is carried by flexible cushion 14 (FIG. 2) or central bearing 19 (FIG. 3) of weigh beam 12. Discrepancies in the alignment of drum 1 result in a counterbalancing movement of the weigh beam so that the ends of carrying beams 8 and attached bearing housings 7 move upwards and downwards thereby to share the load equally on the two bearings 5 and 6 of housing 7. The misalignment of roller shaft 4 in relation to carrying beams 8 partly is compensated by spherical bearings 6, and the misalignment of carrying beam 8 in relation to weigh beam 12 is compensated by flexible cushions 13 (FIG. 2) or combined bearings 20 (FIG. 3). This advantageously permits horizontal and angular displacements of the ends of weigh beam 12 to compensate for misalignment.

When hydraulic cylinders 15 are installed, they participate with flexible cushion 14 (FIG. 2) or bearing 19 (FIG. 3) in sharing the load. The pressure in cylinders 15 acts as a measure of the load on the roller supports. Means 15' may be provided to control the load distribution on the bearings in the individual roller supports and on all the roller supports for drum 1.

Additionally, load control equipment may be installed in flexible cushion 14 (FIG. 2) or central bearing 19 (FIG. 3) of weigh beam 12 (in the form of load cells) or on the weigh beam proper (in the form of strain gauges). The control equipment permits central control of the performance of the drum and acts as an indication of the load distribution along the drum. This control system may be arranged to provide automatic or intermittent adjustment of the roller support arrangement or reduce misalignments which are indicated by excessive or uneven loads on the cylinders.

While the invention has been described in conjunction with certain embodiments, it is to be understood that various modifications and changes may be made without departing from the spirit and scope of the invention. For example, bearings 13, 14, 19 and 20 may be used in different combinations depending upon the character of the drum and its misalignment, for example, due to the influence of heat.

We claim:

1. An arrangement for supporting a rotary drum upon a foundation, said drum having a ring-like member positioned thereabout which comprises:

a roller shaft positioned generally longitudinal of the drum and being supported at each end portion relative to the foundation by first and second bearing means, roller means being positioned generally medial of said roller shaft in rotational engagement with said ring-like member to provide support for the drum, first and second support beams extending generally transverse of the longitudinal axis of the drum, one end portion of each support beam being pivotally mounted on the foundation for pivotal movement about an axis generally parallel to the axis of the drum, said support beams being spaced to support said first and second roller shaft bearing means and being movably supported by support means positioned at the other end portion, a third support beam extending generally parallel to the axis of the drum and supporting the movable end portion of said first and second support beams, said third support beam being supported generally medially upon the foundation by rocking bearing means permitting rocking motion of said third support beam.

2. An arrangement for at least partially supporting a rotary drum such as a rotary kiln upon a foundation which comprises:
    (a) a weigh beam positioned in a generally horizontal plane and supported upon the foundation;
    (b) means disposed between said weigh beam and the foundation for pivotally supporting said weigh beam upon the foundation;
    (c) at least two carrying beams positioned in a generally horizontal plane adjacent and generally transverse to said weigh beam, each of said carrying beams being pivotally mounted to the foundation at one end portion thereof;
    (d) means for movably supporting the other end portion of each carrying beam upon said weigh beam; and
    (e) roller means supported upon said carrying beams for rotatably supporting the rotary drum, said support arrangement thereby providing a substantial mechanical equalization of forces exerted on the roller means during rotation of said drum.

3. The support arrangement according to claim 2 wherein the roller means includes bearing means for rotatably supporting said roller means on said carrying beams.

4. The support arrangement according to claim 3 wherein the roller means comprises a roller having a roller shaft for rotation therewith and rotatably secured in said bearing means.

5. The support arrangement according to claim 4 wherein the bearing means comprises:
    (a) at least two bearing housings, each housing mounted on a respective carrying beam;
    (b) at least two bearings, each bearing configured as a section of a sphere and resting in a respective bearing housing; and
    (c) at least two plain bearings, each plain bearing resting in a respective bearing of the bearing means to pivot therein, and each plain bearing supporting the roller shaft so that the roller shaft pivots in the bearing means.

6. The support arrangement according to claim 4 wherein the carrying beams support means comprises at least one composite bearing having:
    (a) a bearing configured as a section of a sphere and secured to said weigh beam; and
    (b) a plain bearing resting upon said bearing of said carrying beams support means to pivot therein and supporting one of said carrying beams so that said carrying beam is supported upon the weigh beam in a yielding manner.

7. The support apparatus according to claim 4 wherein the carrying beams support means comprises at least one flexible cushion disposed between one of said carrying beams and said weigh beam.

8. The support arrangement according to claim 4 wherein the weigh beam support means comprises at least one bearing having a partly spherical configuration and disposed between said weigh beam and the foundation to facilitate rocking movement of said weigh beam and mechanically equalize the forces acting on the weigh beam during the rotation of the drum.

9. The support arrangement according to claim 6 wherein the weigh beam support means comprises at least one bearing having a partly spherical cofiguration and disposed between said weigh beam and the foundation to facilitate a rocking movement of said weigh beam and mechanically equalize the forces acting on the weigh beam during the rotation of the drum.

10. The support arrangement according to claim 4 wherein the weigh beam support means comprises at least one flexible cushion disposed between said weigh beam and the foundation to facilitate rocking movement of said weigh beam and mechanically equalize the force exerting upon said weigh beam during the rotation of the drum.

11. The support arrangement according to claim 7 wherein the weigh beam supporting means comprises at least one flexible cushion disposed between said weigh beam and the foundation to effect a rocking movement of said weigh beam and mechanically equalize the force exerting upon said weigh beam during the rotation of the drum.

12. The support arrangement according to claim 4 which further comprises at least two hydraulic cylinders, each of said hydraulic cylinders disposed between a respective end portion of said weigh beam and said foundation to further balance the weigh beam in response to forces exerted upon said weigh beam by the rotation of the drum.

13. The support arrangement according to claim 12 which further comprises control means for measuring the forces exerted on the weigh beam and activating the hydraulic cylinders to act upon said weigh beam in a predetermined manner and thereby further equalize said forces.

14. The support arrangement according to claim 4 wherein:
   (a) the bearing means comprises:
      (i) at least two bearing housings, each housing mounted on a respective carrying beam;
      (ii) at least two bearings, each bearing having a partly spherical configuration and resting in a respective bearing housing; and
      (iii) at least two plain bearings, each plain bearing resting in a respective bearing of the bearing means to pivot therein and supporting the roller shaft so that the roller shaft pivots in the bearing means;
   (b) the carrying beams support means comprises at least two flexible cushions, each cushion flexibly disposed between a respective carrying beam and said weigh beam; and
   (c) the weigh beam supporting means comprises a flexible cushion disposed between said weigh beam and the foundation to facilitate rocking movement of said weigh beam and mechanically equalize the forces acting on the weigh beam during the rotation of the drum.

15. The support arrangement according to claim 14 which further comprises at least two hydraulic cylinders, each of said hydraulic cylinders disposed between a respective end portion of said weigh beam and said foundation to further balance the weigh beam in response to forces exerted upon said weigh beam by the rotation of the drum.

16. The support arrangement according to claim 4 wherein:
   (a) the bearing means comprises:
      (i) at least two bearing housings, each housing mounted on a respective carrying beam;
      (ii) at least two bearings, each bearing having a partly spherical configuration and resting in a respective bearing housing; and
      (iii) at least two plain bearings, each plain bearing resting in a respective bearing of the bearing means to pivot therein and supporting the roller shaft so that the roller shaft pivots in the bearing means;
   (b) the carrying beams support means comprises two composite bearings, each composite bearing secured to a respective carrying beam and having:
      (i) a bearing having a partly spherical configuration; and
      (ii) a plain bearing resting upon said bearing of said carrying beams support means to pivot therein and supporting a respective carrying beam so that said carrying beams are supported upon said weigh beam in a yielding manner; and
   (c) the weigh beam support means comprises one bearing having a partly spherical configuration and disposed between said weigh beam and the foundation to facilitate a rocking movement of said weigh beam and mechanically equalize the forces acting on the weigh beam during the rotation of the drum.

17. The support arrangement according to claim 16 which further comprises at least two hydraulic cylinders, each of said hydraulic cylinders disposed between a respective end portion of said weigh beam and said foundation to further balance the weigh beam in response to forces exerted upon said weigh beam by the rotation of the drum.

18. An arrangement for supporting a rotary drum such as a rotary kiln upon a foundation which comprises:
   (a) a weigh beam having its longitudinal axis positioned in a generally horizontal plane and the weigh beam being supported upon the foundation;
   (b) at least one flexible cushion positioned between said weigh beam and the foundation to effect rocking movement of said weigh beam;
   (c) two carrying beams positioned in a generally horizontal plane generally parallel to each other and transverse to the longitudinal axis of said weigh beam, each of said carrying beams pivotally mounted at one end portion thereof to the foundation and movably supported at the other end portion thereof by said weigh beam;
   (d) means for pivotally mounting one end portion of each carrying beam upon said foundation;
   (e) at least two flexible cushions, each cushion positioned between the other end portion of a respective carrying beam and said weigh beam so that the carrying beams are supported upon said weigh beam in a yielding manner;
   (f) a roller spaced substantially equidistant between said carrying beams for rotatably supporting the rotary drum; and (g) two roller bearing means for rotatably supporting the roller, each roller bearing means secured to a respective carrying beam and having:
  (i) a bearing housing mounted on a respective carrying beam;
  (ii) a bearing configured as a section of a sphere and resting in a respective bearing housing; and
  (iii) a plain bearing pivotally resting in a bearing of the roller bearing means and supporting the roller, said support arrangement effecting a substantial mechanical equalization of forces exerted on the roller during the rotation of said drum due to warping and twisting thereof.

19. The support arrangement according to claim 18 which further comprises at least two hydraulic cylinders, each of said hydraulic cylinders connected between a respective end portion of said weigh beam and said foundation to further balance the weigh beam with respect to forces exerted upon said weigh beam by the rotation of the drum.

20. The support arrangement according to claim 19 which further comprises control means for measuring the forces exerted on the weigh beam and activating the hydraulic cylinders to act upon said weigh beam in a predetermined manner and thereby further equalize said forces.

21. An arrangement for supporting a rotary drum such as a rotary kiln upon a foundation which comprises:
  (a) a weigh beam having its longitudinal axis positioned in a generally horizontal plane and the weigh beam being supported by the foundation;
  (b) one bearing having a partly spherical configuration and positioned between said weigh beam and the foundation to facilitate a rocking movement of said weigh beam;
  (c) two carrying beams positioned in a generally horizontal plane generally parallel to each other and transverse to the longitudinal axis of said weigh beam, each of said carrying beams pivotally mounted at one end portion thereof to the foundation and flexibly supported at the other end portion thereof by said weigh beam;
  (d) means for pivotally mounting one end portion of each carrying beam upon said foundation;
  (e) two composite bearings for supporting the other end portion of each carrying beam upon said weigh beam in a yielding manner, each composite bearing having:
    (i) a bearing configured as a section of a sphere and secured to said weigh beam; and
    (ii) a plain bearing resting upon said bearing of said composite bearing to pivot therein and supporting a respective carrying beam so that the carrying beams are supported upon said weigh beam in a yielding manner;
  (f) a roller spaced substantially equidistant between said carrying beams for rotatably supporting the rotary drum; and
  (g) two roller bearing means for rotatably supporting the roller, each roller bearing means secured to a respective carrying beam and having:
    (i) a bearing housing mounted on a respective carrying beam;
    (ii) a bearing configured as a section of a sphere and resting in a respective bearing housing; and
    (iii) a plain bearing pivotally resting in a bearing of the roller bearing means and supporting the roller, said support arrangement effecting a substantial mechanical equalization of forces exerted on the roller during rotation of said drum due to warping and twisting thereof.

22. The support arrangement according to claim 21 which further comprises at least two hydraulic cylinders, each of said hydraulic cylinders connected between a respective end portion of said weigh beam and said foundation to further balance the weigh beam with respect to forces exerted upon said weigh beam by the rotation of the drum.

23. The support arrangement according to claim 22 which further comprises control means for measuring the forces exerted on the weigh beam and activating the hydraulic cylinders to act upon said weigh beam in a predetermined manner and thereby further equalize said forces.

* * * * *